United States Patent [19]

Hirayama et al.

[11] Patent Number: 5,782,968

[45] Date of Patent: Jul. 21, 1998

[54] METHOD FOR PRODUCING BLACK PIGMENT

[75] Inventors: Takayuki Hirayama; Haruyoshi Sato, both of Kawasaki; Yutaka Otsuki, Yokohama, all of Japan

[73] Assignee: Nippon Oil Co., Ltd., Tokyo, Japan

[21] Appl. No.: 760,377

[22] Filed: Dec. 4, 1996

[30] Foreign Application Priority Data

Dec. 6, 1995 [JP] Japan .................. 7-318161

[51] Int. Cl.⁶ .................................. C09C 1/44
[52] U.S. Cl. .......................... 106/476; 106/472
[58] Field of Search .................... 106/476, 472

[56] References Cited

U.S. PATENT DOCUMENTS

| | | | |
|---|---|---|---|
| 4,379,871 | 4/1983 | Werle et al. | 523/331 |
| 4,988,420 | 1/1991 | Batzill et al. | 204/181.1 |
| 5,106,417 | 4/1992 | Hauser et al. | 106/20 |
| 5,190,586 | 3/1993 | Mizuguchi et al. | 106/499 |

*Primary Examiner*—Deborah Jones
*Attorney, Agent, or Firm*—Darby & Darby

[57] ABSTRACT

A method for producing a black pigment including the step of contacting a polymer (1) containing 5 to 500 mmol of hydroxyl groups, and optionally 30 to 300 mmol of carboxyl groups per 100 g of the polymer with a carbon material (2) at a temperature of 50 to 250° C. The obtained black pigment can be dispersed in a dispersion media at a high density, can be used for producing a black-hued ink, a black-hued electrodeposition coating material, a thermosetting black-hued coating material, a photocuring black-hued coating material, and a photocuring black-hued electrodeposition coating material, and is useful as a material for a black matrix of a color filter or a counterelectrode substrate for black and white display TFT array substrate.

11 Claims, 3 Drawing Sheets

METHOD FOR PRODUCING BLACK PIGMENT

BACKGROUND OF THE INVENTION

This invention relates to a method for producing a black pigment, more specifically, to a method for producing a black pigment which has excellent affinity with water, an organic solvent, and an organic polymer.

PRIOR ART

A carbon material such as carbon black and graphite is used for a variety of purposes such as a reinforcing agent for resins or rubber, or a filler, as well as a toner for electrostatic charge image development, a thermal transfer ink, a light-shielding layer for a black and white liquid crystal display, a black matrix of a color filter for a color liquid crystal display, and the like since the carbon material has excellent coloring ability, electrical conductivity, weatherability, and resistance against chemicals.

The carbon material is usually in the form of powders or particles. It is seldom used alone, but usually in the form of a homogeneous dispersion in a solid matrix such as a resin or rubber, or in a liquid such as water or a solvent, to exhibit its properties. However, affinity of the carbon material, in particular carbon black, with other substance such as an organic polymer, water, or an organic solvent is usually weaker than the agglomerating force between each particles thereof, so that it is difficult to prepare homogeneous mixture or dispersion of the carbon material under ordinary conditions.

This difficulty in dispersing the carbon material causes serious problems in producing a light-shielding layer of a black and white liquid crystal display, a black matrix of a color filter, or the like. For example, when the carbon material is used as a light-shielding material for producing a light-shielding layer for a black and white or a color liquid crystal display, the film thickness of the light-shielding layer is preferably 1 to 2 μm. However, in order to produce such a thin light-shielding layer yet having sufficient light-shielding properties, it is necessary to employ a coating material wherein the carbon black is dispersed at as high density as 25 to 60% by weight in a carrier fluid. It is difficult to attain a stable dispersion of the carbon material such as ordinary carbon black at such high density by a known method of pigment dispersion.

As a method for forming a light-shielding layer of a black and white liquid crystal display, a black matrix of a color filter, or the like, on a substrate of a display having a transparent electrically conductive layer, an electrodeposition method has recently been attracting attention, which was known as a method for forming a coating film on an electrically conductive surface such as a metallic outside plate of an automobile or electrical parts. However, for preparing an electrodeposition coating material for electrodepositing the carbon material such as carbon black as a light-shielding material, the carbon black should be finely pulverized by a dispersion apparatus such as a sand mill or a ball mill, or classified by centrifuge due to its poor dispersibility. These operations are extremely complicated, and the process thereof is not reproducible. Further, even the carbon material is subjected to these operations, the coating layer containing the carbon material at high density will have a very rough surface, and the electrical conductivity of the coating film itself cannot be restrained since the carbon material usually has high electrical conductivity. Further, a black-hued electrodeposition coating material prepared by dispersing the carbon material through an ordinary dispersion method has drawbacks in that its electrodeposition properties change largely with the lapse of time, and the film thickness of the electrodeposited film is hard to control.

Various discussions have been made to solve these problems. For example, a number of studies have been made to improve the dispersibility of the carbon material by reacting the surface of the carbon material with a variety of resins to coat the same, thereby increasing the affinity of the carbon material with a solid or a liquid matrix. Specifically, there is an attempt wherein various kinds of polymerizable monomers are polymerized in a mixture of the monomers and the carbon material such as carbon black to graft a resin on the surface or the like of the carbon black, thereby giving hydrophilic or lipophilic properties to the carbon material, to improve the dispersibility of the carbon material (Japanese Patent Publication Nos. 42-22047 and 46-26970). However, yield of the obtained grafted material and grafting efficiency are remarkably low, so that affinity of the carbon material with other substance is also low and sufficient dispersibility is not achieved.

Japanese Laid-open Patent Application Nos. 63-265913, 63-270767, and 6-301239 disclose a grafted material obtained by reacting a carbon material such as carbon black with a polymer having an epoxy group, a thioepoxy group, an aziridine group, an oxazoline group, or an N-hydroxyalkylamido group (simply referred to as a "conventional reactive groups" hereinbelow). It is described that this grafted material has increased grafting efficiency compared to the above grafted material using polymerizable monomers, improved affinity with water and an organic solvent, and relatively good dispersibility in water and an organic solvent. However, the dispersibility of this grafted material is not sufficient for charging the grafted material in a carrier fluid at a high density, and thus being inadequate as a material for a light-shielding layer which is required of thinness, light-shielding properties, and high precision. These patent applications also disclose to have a hydroxyl group or a carboxyl group contained in the polymer as a functional group. However, if a large amount of hydroxyl groups and/or carboxyl groups are contained in the polymer in addition to the conventional reactive groups, the hydroxyl groups or the carboxyl groups easily react with the conventional reactive groups, which causes cross-linking between the polymers to give a gel, thereby remarkably decreasing the dispersibility. Therefore, it is not intended in each of the above patent applications that the polymers described include the polymers containing a large amount of hydroxyl groups or carboxyl groups therein. Further, even if polymers which are not susceptible to gelation are selected for use from the polymers having the conventional reactive groups, the polymers containing sufficient amount of conventional reactive groups for reaction with the carbon material will not react uniformly with powders of the carbon material such as carbon black, thereby producing carbonaceous materials which vary in grafting ratio, affinity with water or an organic solvent, compatibility with various resins, and dispersibility, so that black pigment with stable properties cannot be produced in an industrial scale.

Therefore, a method for improving the dispersibility of the carbon material such as carbon black by grafting polymers which are reactive with the functional groups on the surface of the carbon material has not yet established.

As a different approach from reacting polymers with the carbon material, there has been attempted to achieve high dispersion ratio of the carbon material by studying the dispersion conditions using a conventional pulverizer, a sand mill, a roll mill, an attriter, a ball mill, or a kneader. But satisfactory results have not yet been obtained.

DISCLOSURE OF THE INVENTION

It is an object of the present invention to provide a method for easily obtaining a black pigment which is superior in affinity with various kinds of polymer materials, water, organic solvents, or the like, and which exhibits excellent dispersibility in water, an organic solvent, or the like even if it is dispersed in high density.

It is an other object of the present invention to provide a method for producing a black pigment which can be used as a pigment for a coating material to give a light-shielding layer which has excellent smoothness, superior light-shielding properties, and suppressed electrical conductivity.

According to the present invention, there is provided a method for producing a black pigment comprising the step of contacting a polymer (1) containing 5 to 500 mmol of hydroxyl groups per 100 g of the polymer with a carbon material (2) at a temperature of 50° to 250° C.

There is also provided a method for producing a black pigment comprising the step of contacting a polymer (1) containing 5 to 500 mmol of hydroxyl groups and 30 to 300 mmol of carboxyl groups per 100 g of the polymer with a carbon material (2) at a temperature of 50° to 250° C.

PREFERRED EMBODIMENTS OF THE INVENTION

Figure 1:
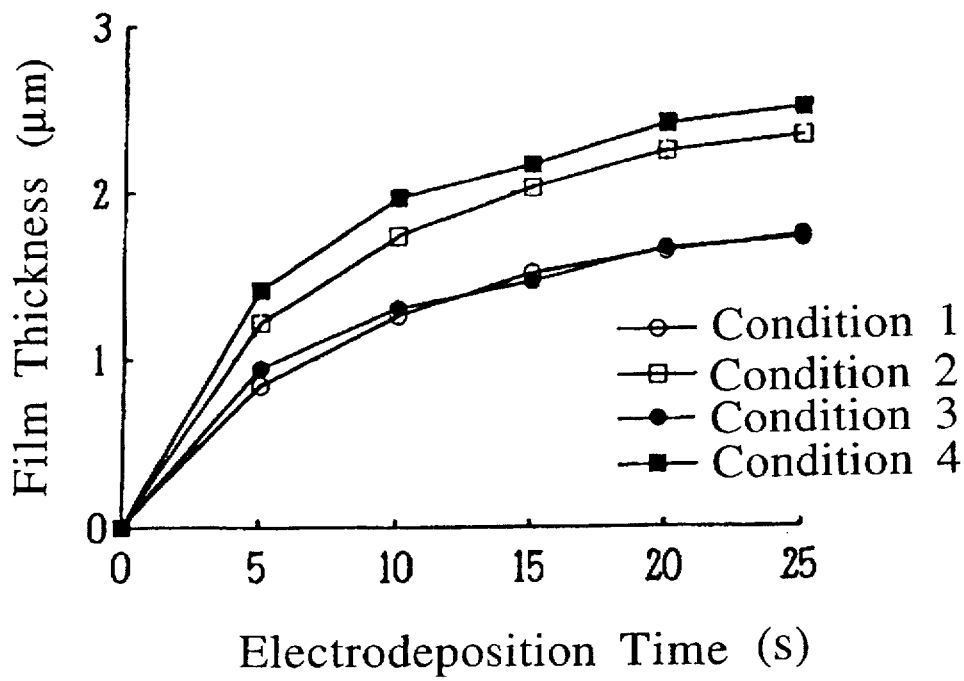
FIG. 1 is a graph showing the results of measurements of the electrodeposition properties of the black-hued electrodeposition coating materials prepared in Example 1.

The method for producing a black pigment of the present invention includes a step of contacting a particular polymer containing a specific amount of hydroxyl groups, and optionally a specific amount of carboxyl groups in addition to the hydroxyl groups (referred to as "polymer (1)" hereinbelow) with a carbon material.

The minimum content of the hydroxyl groups in the polymer (1) is 5 mmol, preferably 20 mmol, while the maximum content of the hydroxyl groups is 500 mmol, preferably 300 mmol per 100 g of the polymer (1). If the content of the hydroxyl groups is less than 5 mmol, it will become difficult to disperse the obtained black pigment in a carrier fluid at a high density for preparing a coating material, so that a coating material which exhibits satisfactory high film strength with thin film thickness cannot be prepared. On the other hand, if the content of the hydroxyl groups is more than 500 mmol, the dispersibility of the obtained black pigment is impaired, and the moisture resistance of the coating film of a coating material prepared with the obtained black pigment becomes unsatisfactory.

The polymer (1) may contain a particular amount of carboxyl groups in addition to the particular amount of the hydroxyl groups for the purpose of improving the dispersibility of the black pigment to be obtained in water and the electrical resistance of the coating film formed of the coating material prepared with the black pigment to be obtained. The minimum content of the carboxyl groups, if contained, in the polymer (1) is usually 30 mmol, preferably 50 mmol, while the maximum content of the carboxyl groups is usually 300 mmol, preferably 100 mmol per 100 g of the polymer (1). By electing the content of carboxyl groups in the polymer (1) to be not less than 30 mmol, the dispersibility of the black pigment to be obtained in water can be improved. On the other hand, by selecting the content of carboxyl groups in the polymer (1) to be not more than 300 mmol of carboxyl groups, the moisture resistance of the coating film formed of the coating material prepared with the black pigment to be obtained can be improved. The polymer (1) may contain other functional groups than hydroxyl groups and carboxyl groups, as long as the effect of the present invention is not deteriorated. However, it is preferred that the polymer (1) substantially contains none of the conventional reactive groups such as an epoxy group, a thioepoxy group, an aziridine group, an oxazoline group and an N-hydroxyalkylamido group, which are susceptible to react with hydroxyl groups or carboxyl groups to cause gelation between the polymers (1).

Examples of the polymer (1) may include acrylic resin, epoxy resin, polyester resin, polyamide resin, polyimide resin, polycarbonate resin, polyurethane resin, polybutadiene resin, a copolymer of maleic anhydride, or derivatives of these resins, all of which contain hydroxyl groups, and preferably also carboxyl groups in the above particular amount in the molecule thereof. Among these resins and the like, acrylic resin is particularly preferred, which can easily be produced in an industrial scale, which can improve smoothness of the coating film formed of the coating material prepared with the black pigment, and which can restrain the electrical conductivity of the coating film at a low level.

The acrylic resin may be obtained by homopolymerizing monomers having hydroxyl groups, or by copolymerizing a monomer having hydroxyl groups and a monomer having carboxyl groups. The monomers having hydroxyl groups and the monomer having carboxyl groups may be mixtures of two or more different kinds of monomers.

Examples of the monomer having hydroxyl groups may include monomers represented by the formulae:

$CH_2=CH—COO—CH_2CH_2—OH$, $CH_2=C(CH_3)—COO—CH_2CH_2—OH$,
$CH_2=CH—COO—CH_2CH(OH)CH_2Cl$,
$CH_2=C(CH_3)—COO—CH_2CH(OH)CH_2Cl$,
$CH_2=CH—COO—CH(CH_3)CH_2—OH$,
$CH_2=C(CH_3)—COO—CH(CH_3)CH_2—OH$,
$CH_2=CH—COO—CH_2CH(OH)CH_3$,
$CH_2=C(CH_3)—COO—CH_2CH(OH)CH_3$,
$CH_2=CH—COO—CH_2CH_2CH_2—OH$,
$CH_2=C(CH_3)—COO—CH_2CH_2CH_2—OH$,
$CH_2=CH—COO—CH_2CH(OH)CH_2—OH$,
$CH_2=C(CH_3)—COO—CH_2CH(OH)CH_2—OH$,
$CH_2=CH—COO—CH_2CH(OH)CH_2CH_3$,
$CH_2=C(CH_3)—COO—CH_2CH(OH)CH_2CH_3$,
$CH_2=CH—COO—CH_2CH_2CH_2CH_2—OH$,
$CH_2=C(CH_3)—COO—CH_2CH_2CH_2CH_2—OH$,
$CH_2=CH—COO—CH_2CH_2—O—CH_2CH_2—OH$, $CH_2=C(CH_3)—COO—CH_2CH_2—O—CH_2CH_2—OH$, $CH_2=CH—COO—CH_2CH_2—OCO—X—COO—CH_2CH(OH)CH_3$, or $CH_2=CH—COO—CH_2CH(OH)—CH_2O—Ph$. Among these, $CH_2=CH—COO—CH_2CH_2—OH$ and $CH_2=C(CH_3)—COO—CH_2CH_2—OH$ are particularly preferred. In the above formulae, X stands for a o-phenylene group, and Ph stands for a phenyl group.

Examples of the monomer having carboxyl groups may include acrylic acid or methacrylic acid.

The polymer (1) may be obtained by copolymerizing other monomers which do not react with a hydroxyl group and a carboxyl group with the monomer having hydroxyl groups and optionally the monomer having carboxyl groups in order to improve the dispersibility of the black pigment or the properties of the coating film formed of the coating material prepared with the black pigment. The above-mentioned other monomers are not particularly limited as long as the effect of the present invention is not deteriorated. Examples of such monomers may include: alkyl (meth) acrylate having 1 to 18 carbon atoms such as methyl (meth)acrylate, ethyl (meth)acrylate, butyl (meth)acrylate, isobutyl (meth)acrylate, hexyl (meth)acrylate, lauryl (meth) acrylate, cetyl acrylate, stearyl acrylate, cyclohexyl (meth) acrylate, benzyl (meth)acrylate, isobornyl (meth)acrylate, 2-methoxyethyl (meth)acrylate, 3-methoxybutyl (meth) acrylate, ethylcarbitol (meth)acrylate, phenoxyethyl (meth) acrylate, trifluoroethyl (meth)acrylate, tetrafluoropropyl (meth)acrylate, hexafluoropropyl (meth)acrylate, octafluoropentyl (meth)acrylate, heptadecafluorodecyl (meth) acrylate, trimethylsiloxyethyl (meth)acrylate, tetrahydrofurfuryl (meth)acrylate, phenoxypolyethylene glycol (meth) acrylate, methoxytripropylene glycol (meth)acrylate, or methoxytriethylene glycol (meth)acrylate; N-substituted maleimide such as N-cyclohexylmaleimide, N-phenylmaleimide, N-(2-chlorophenyl)maleimide, or N-laurylmaleimide; a styrene monomer such as styrene, o-methylstyrene, m-methylstyrene, p-methylstyrene, p-methoxystyrene, p-tert-butylstyrene, p-phenylstyrene, o-chlorostyrene, m-chlorostyrene, or p-chlorostyrene; ethylene, propylene, butylene, vinyl chloride, vinyl acetate, acrylonitrile, N-vinylpyrrolidone, or mixtures thereof.

The polymer (1) may be produced with the above monomers by radical polymerization, anionic polymerization, or the like polymerization method. The polymerization may be carried out by a conventional operation such as solution polymerization, suspension polymerization, emulsion polymerization, precipitation polymerization, or bulk polymerization. Among these, solution polymerization is particularly preferred. When the solution polymerization is employed, the reaction solvent may be an organic solvent such as isopropyl alcohol, methyl ethyl ketone, hexane, butyl cellosolve, diethylene glycol dimethyl ether, triethylene glycol dimethyl ether, or mixtures thereof.

The number average molecular weight of the polymer (1) is preferably 1000 to 100000, more preferably 5000 to 30000. By electing the number average molecular weight of the polymer (1) to be not less than 1000, sufficient affinity with water, an organic solvent, an organic polymer material, or the like can be given to the black pigment to be obtained. On the other hand, by selecting the number average molecular weight of the polymer (1) to be not more than 100000, the polymer (1) has viscosity at which the mixing operation in contacting can be performed.

Examples of the carbon material employed in the method of the present invention may include, for example, carbon black, aniline black, phenylene black, titan black, graphite, carbon fiber, or carbon whisker. Among these, carbon black is preferred due to the coloring ability and readiness of the reaction of the black pigment to be obtained. Further, carbon material having on the surface thereof at least one functional group selected from the group consisting of a quinone group, a carboxyl group, an urethane group, and a hydroxyl group is preferred in view of the reactivity with the polymer (1).

The average particle size of the carbon black is preferably not more than 1 µm, more preferably 0.01 to 0.5 µm, most preferably 0.01 to 0.3 µm.

Also, it is preferred that the carbon black has a pH value of not more than 7, more preferably 1 to 6, most preferably 1 to 4, as measured in the form of an aqueous solution by a method according to ISO-787-9, in terms of its readiness of the reaction with the polymer(1).

Examples of the carbon black may include furnace black, channel black, acetylene black, and lamp black. Among these, channel black is preferred in terms of its average particle size and pH value.

Method of the contacting the polymer (1) with the carbon material is not particularly limited as long as it is carried out at the particular temperature to be discussed later, but it is usually preferable to contact by mixing under stirring. In particular, in order to improve the homogeneity of the resulting mass, the contacting is preferably carried out by kneading under heating using an ordinary pulverizer such as a sand mill, a roll mill, an attriter, a ball mill, or a kneader.

The temperature for contacting the polymer (1) with the carbon material is 50° C., preferably 100° C. at the lowest, and 250° C., preferably 200° C. at the highest. If the contacting temperature is less than 50° C., the viscosity of the polymer (1) upon contacting is low, and the kneading operation becomes difficult. If the contacting temperature is more than 250° C., gelation or decomposition of the polymer (1) may occur upon contacting.

The duration of contacting of the polymer (1) with the carbon material is preferably 1 minute to 24 hours, more preferably 3 minutes to 5 hours.

The mixing ratio of the polymer (1) to the carbon material for contacting is preferably 0.5:1 to 5:1, more preferably 1:1 to 2:1 by weight.

The contacting of the polymer (1) with the carbon material may be carried out in the presence of a solvent such as isopropyl alcohol, methyl ethyl ketone, hexane, diethylene glycol dimethyl ether, or the like.

The black pigment obtained by the method of the present invention (referred to as "black pigment A" hereinbelow) may be used for preparing a variety of black-hued coating materials. For example, a printing ink may be prepared by adding the black pigment A to a various binder resins, or a black-hued electrodeposition coating material may be prepared by dispersing the black pigment A in a carrier fluid such as water.

In preparing the black-hued electrodeposition coating material, the maximum particle size of the black pigment A is preferably not more than 1 µm. By selecting the maximum particle size of the black pigment A to be not more than 1 µm, stability of the black-hued electrodeposition coating material, and light-shielding properties, smoothness, and definition of the coating film obtained by applying the black-hued electrodeposition coating material may further be improved. The particle size of the black pigment A after it is dispersed in a electrodeposition solution is preferably not more than 0.5 µm in number average particle size (dn), more preferably 0.001 to 0.3 µm in dn and not more than 2.5 in dv (weight average particle size )/dn, most preferably 0.001 to 0.3 µm in dn and not more than 2 in dv/dn.

When the black-hued electrodeposition coating material is prepared without using a binder resin for electrodeposition to be discussed later, it is preferred to employ the black pigment A prepared with the polymer (1) having 100 to 500 mmol of hydroxyl groups per 100 g of the polymer and optionally 80 to 300 mmol of carboxyl groups per 100 g of the polymer in order to improve sufficiently the dispersibility of the black pigment A itself in water.

In preparing the black-hued electrodeposition coating material, a binder resin for electrodeposition may be added for improving the dispersibility of the black pigment A in water. Preferred examples of the binder resin for electrodeposition may include resins having at least one cationic group or at least one anionic group.

Examples of the resin having at least one cationic group may include resins which are obtained by introducing at least one amino group or onium group such as ammonium, sulfonium, or phosphonium into a resin such as acrylic resin, epoxy resin, urethane resin, polybutadiene resin, or polyamide resin. It is preferred to use these resins after they are neutralized with acid such as formic acid, acetic acid, propionic acid, or lactic acid or an acid substance to make the resin soluble or dispersible in water.

Examples of the resin having at least one anionic group may include acrylic resin, polyester resin, unsaturated fatty oil resin, polybutadiene resin, or epoxy resin, all having at least one carboxyl group or the like. It is preferred to use these resins after they are neutralized with a basic substance such as triethylamine, diethylamine, dimethylethanolamine, ammonia, or the like to make the resins soluble or dispersible in water.

In preparing the black-hued electrodeposition coating material, a curing agent may optionally be added. Examples of the curing agent may include, for example, melamine, benzoguanamine, urea, or derivatives of these compounds; amino resin such as melamine resin or urea resin; phenol resin; or blocked isocyanato. The curing agent may be used as it is, or a functional group thereof may suitably be modified before use. In particular, melamine all of which methylol groups are etherified (i.e. fully etherified melamine) is preferred since it is stable at or near the room temperature for a prolonged time and reacts at 100° C. or higher temperature.

In preparing the black-hued electrodeposition coating material, other coloring agent than the black pigment A may be added. Examples of the other coloring agent may include, for example, a dye or a pigment such as vanadium trioxide, manganese dioxide, molybdenum disulfide, triiron tetraoxide, Aniline Black, Sudan Black B, Acid Black 1 and 52, Fast Black K Salt, Nigrosin, or mixtures thereof. More specifically, the dyes and pigments shown in "COLOR INDEX", third edition, may be employed.

In preparing the black-hued electrodeposition coating material, various assistant agents such as a dispersion assistant agent for the above-mentioned other coloring agents, a leveling agent for improving the smoothness of the coating film, a viscosity adjustment agent, or an anti-foaming agent may be added.

Specific method for preparing the black-hued electrodeposition coating material may include mixing the black pigment A optionally with the binder resin for electrodeposition, the curing agent, other coloring agent as mentioned above, the various kinds of assistant agents, an organic solvent, water, acidic substance, and/or basic substance; dispersing the components thoroughly using a conventionally used dispersing apparatus such as a sand mill, a roll mill, an attriter, a ball mill, a homogenizer, or the like; and diluting the resulting dispersion with water to have the solid content of usually 4 to 25% by weight, preferably 7 to 20% by weight.

In preparing the black-hued electrodeposition coating material, when the black pigment A is used after the carboxyl groups therein are neutralized with a basic substance such as ammonia, trimethylamine, triethylamine, sodium hydroxide, or potassium hydroxide, solubility of the black pigment A in an organic solvent or water is improved, and thus the black-hued electrodeposition coating material may be prepared by dispersing the black pigment A using an ordinary stirring apparatus without the dispersing operation using the dispersion apparatus as mentioned above.

The black pigment A may be mixed with a thermosetting resin or the like to prepare a thermosetting black-hued coating material. In preparing the thermosetting black-hued coating material, the black pigment A may be used as it is. But in order to improve the thermosetting properties of the coating material or the durability of the coating film, at least one functional groups which causes thermosetting may be added to the polymer portions of the black pigment A, i.e. the portions originated from the polymer (1) of the black pigment A before use. In this case, the thermosetting black-hued coating material may be prepared without a thermosetting resin.

Thermosetting resin is a resin having at least one functional group which causes thermosetting such as an acid anhydride group including an epoxy group, a succinic anhydride group, or a phthalic anhydride group; a carbon-carbon double bond; a hydroxyl group; an aldehyde group; or an acid group including a carboxylic group or a sulfonic acid group. Specific examples of the thermosetting resin may include resins prepared by introducing at least one functional group which causes thermosetting, for example, an acid group such as a carboxyl group into a resin such as acrylic resin, polyester resin, unsaturated fatty oil resin, polybutadiene resin, epoxy resin, polyimide resin, or polyamide resin. It is preferred to use these resins after they are neutralized with a basic substance such as trimethylamine, triethylamine, dimethylethanolamine, ammonia, or the like to make the resins soluble or dispersible in water.

In preparing the thermosetting black-hued coating material, other curing agent may optionally be added in addition to the thermosetting resin. Examples of the curing agent may include, for example, melamine, benzoguanamine, urea, and derivatives of these compounds; amino resins such as melamine resin or urea resin; phenol resin; or blocked isocyanato. The curing agent may be used as it is, or a functional group thereof may suitably be modified before use. In particular, fully etherified melamine is preferred since it is stable at or near the room temperature for a prolonged time and reacts at 100° C. or higher temperature.

In preparing the thermosetting black-hued coating material, other coloring agent than the black pigment A may be added. Examples of the coloring agent may include, for example, a dye or a pigment such as vanadium trioxide, manganese dioxide, molybdenum disulfide, triiron tetraoxide, Aniline Black, Sudan Black B, Acid Black 1 and 52, Fast Black K Salt, Nigrosin, or mixtures thereof. More specifically, the dyes and pigments shown in "COLOR INDEX", third edition, may be employed.

In preparing the thermosetting black-hued coating material, various assistant agents such as a dispersion assistant agent for the above-mentioned other coloring agents, a leveling agent for improving the smoothness of the coating film, or a viscosity adjustment agent may be added.

Specific method for preparing the thermosetting black-hued coating material may include mixing the black pigment A optionally with the thermosetting resin, the curing agent, other coloring agent as mentioned above, and/or the various kinds of assistant agents. The mixing may be carried out by an ordinary mixing apparatus or a dispersing apparatus. The obtained thermosetting black-hued coating material may be filtered before use in order to remove coarse particles, foreign substances, or the like in the system. The filtration may be carried out, for example, by a filter media of membrane, surface, or depth type with the pore size of not more than 5 μm, particularly 0.1 to 3 μm under pressure.

The thermosetting black-hued coating material may be diluted with an organic solvent for improving the readiness for coating on a substrate. Examples of the organic solvent may include alkyl cellosolves such as methyl cellosolve, ethyl cellosolve, propyl cellosolve, isopropyl cellosolve, or butyl cellosolve, or acetates of these alkyl cellosolves; alkylene glycols such as ethylene glycol, diethylene glycol, or propylene glycol, or alkyl ethers or alkyl ether acetates of these alkylene glycols; cyclohexanone, diethyleneglycol dimethyl ether, toluene, xylene, or mixtures thereof. Upon diluting the thermosetting black-hued coating material with the organic solvent, it is preferred to adjust the solid content to be usually 5 to 80% by weight.

The thermosetting black-hued coating material may be used for producing a black matrix of a color filter. The black matrix may be produced, for example, by a photolithographic method, an off-set printing, an intaglio printing, or a relief printing. Among these, a photolithographic method is preferred in terms of precision. However, since the photolithographic method employs an alkaline developing solution, the thermosetting black-hued coating material should be soluble in alkali. Two examples of the photolithographic method using the thermosetting black-hued coating material are discussed below.

In the first example, the thermosetting black-hued coating material is coated on a support body such as a glass plate, a polycarbonate plate, a silicone wafer, a plastic sheet, or paper by a coating method using a bar coater, a spin coater, or a roll coater, or such method as spray coating, dipping, gravure printing, or screen printing, and is dried to obtain a black-hued coating film. Then photoresist which can be developed with alkali is coated over the black-hued coating film by a coating method using a bar coater, a spin coater, or a roll coater, or by such method as spray coating, dipping, gravure printing, or screen printing, dried, and then exposed to light via a predetermined photomask. After that, the desired portions of the photoresist film are developed with an alkali developing solution, and simultaneously the black-hued coating film portions under the resist portions which have been developed and removed are also dissolved and removed. After this process, the black-hued coating film is heated at a low temperature not deteriorating the photoresist to disable the removal thereof, for example, at 80° to 150° C., to cure the black-hued coating film, and then the photoresist is developed and removed to obtain the desired black matrix.

In the second example, photoresist is coated on a substrate by a coating method using a bar coater, a spin coater, or a roll coater, or by such method as spray coating, dipping, gravure printing, or screen printing, and portions of the photoresist corresponding to the position of the black matrix are developed and removed by a photolithographic method. After that, the thermosetting black-hued coating material is coated by a spin coater or the like to form a thin film thereon, and the obtained black-hued coating film was heated at a low temperature not deteriorating the photoresist to disable the removal thereof, for example, at 80° to 150° C., to give resistance to the black-hued coating film against the developing solution. Finally, the remaining resist is removed to form a black matrix.

The film thickness of the obtained black matrix is usually 0.2 to 5.0 μm.

The black pigment A may be mixed with a photocuring compound having at least one carbon-carbon double bond (referred to as a "double bond-containing photocuring compound" hereinbelow) and a photopolymerization initiator or the like to prepare a photocuring black-hued coating material.

In preparing the photocuring black-hued coating material, the black pigment A may be used as it is. But in order to improve the photocuring properties of the coating material and the durability of the coating film, the black pigment A may be modified to introduce at least one photocuring carbon-carbon double bond therein before use. The black pigment A having at least one photocuring carbon-carbon double bond introduced therein may be produced, for example, by adding glycidyl (meth)acrylate to some of the carboxyl groups contained in the black pigment A. When the black pigment A having the photocuring carbon-carbon double bond introduced therein is employed, the photocuring black-hued coating material may be produced without the double bond-containing photocuring composition.

Examples of the double bond-containing photocuring composition may include, for example, esters of acrylic acid or methacrylic acid as well as monohydric or polyhydric alcohols such as ethylacrylate, butylacrylate, hydroxyethylacrylate, hydroxyethylmethacrylate, ethylene glycol dimethacrylate, pentaerythritol triacrylate, pentaerythritol trimethacrylate, dipentaerythritol pentaacrylate, dipentaerythritol pentamethacrylate, dipentaerythritol hexaacrylate, or dipentaerythritol hexamethacrylate; polyester (meth)acrylate obtained by reacting (meth)acrylic acid with polyester prepolymer prepared by condensing polyhydric alcohol and monobasic or polybasic acid; polyurethane (meth)acrylate obtained by reacting a compound having a polyol group with a compound having two isocyanato groups, followed by reacting with (meth)acrylic acid; epoxy (meth)acrylate obtained by reacting (meth)acrylic acid with an epoxy resin such as bisphenol A epoxy resin, bisphenol F epoxy resin, novolak epoxy resin, polycarboxylic acid polyglycidyl ester, polyolpolyglycidyl ether, aliphatic epoxy resin, alicyclic epoxy resin, amine epoxy resin, triphenolmethane epoxy resin, or dihydroxybenzene epoxy resin; or mixtures thereof.

Preferred examples of the double bond-containing photocuring compound may include a double bond-containing photocuring compound having at least one acid group such as a carboxyl group. When a double bond-containing photocuring compound having at least one acid group is used, the polymerization rate of the double bond-containing photocuring compound in the atmosphere is increased, and development of the resist by an aqueous developing solution is enabled, thus being preferred. Examples of the double bond-containing photocuring compound having at least one acid group may include epoxy (meth)acrylate to which carboxylic acid is added obtained by reacting an acid anhydride with a hydroxyl group generated by reacting (meth)acrylic acid with an epoxy group contained in bisphenol A epoxy resin, bisphenol F epoxy resin, novolak epoxy resin, polycarboxylic acid polyglycidyl ester, polyolpolyglycidyl ether, aliphatic epoxy resin, alicyclic epoxy resin, amine epoxy resin, triphenolmethane epoxy resin, dihydroxybenzene epoxy resin, or the like; a half-esterified copolymer of maleic anhydride and ethylene, propylene, isobutylene, styrene, vinylphenol, acrylic acid, acrylic acid ester, acrylamide, or mixtures thereof, obtained by reacting the maleic anhydride portion the copolymer with an acrylate having an alcoholic hydroxyl group such as hydroxylethylacrylate, or an acrylate having an epoxy group such as glycidylmethacrylate; a copolymer of acrylic acid or an acrylic acid ester and an acrylate having an alcoholic hydroxyl group such as hydroxyethylacrylate, a hydroxyl group of which copolymer is reacted with acrylic acid; or mixtures thereof.

When the double bond-containing photocuring compound having at least one acid group is used, it is preferred to use an epoxy compound together since the two compounds thermally react and are cross-linked to further improve the heat resistance of the compound. Examples of the epoxy compound may include, for example, bisphenol A epoxy resin, bisphenol F epoxy resin, novolak epoxy resin, polycarboxylic acid polyglycidyl ester, polyolpolyglycidyl ether, aliphatic epoxy resin, alicyclic epoxy resin, amine epoxy resin, triphenolmethane epoxy resin, dihydroxybenzene epoxy resin, or the like.

Preferred content of the epoxy compound is usually not more than 30% by weight, preferably 5 to 15% by weight of the double bond-containing photocuring compound.

Preferred average molecular weight of the double bond-containing photocuring compound is not less than 1000 since the photopolymerization rate becomes extremely fast in this range.

Preferred content of the double bond-containing photo-curing compound is 30 to 80% by weight of the photocuring black-hued coating material for efficient photopolymerization.

Examples of the photopolymerization initiator may include, for example, benzoin ether, benzoin isobutyl ether, benzoin isopropyl ether, benzophenone, benzoylbenzoic acid, methyl benzoylbenzoic acid, 4-benzoyl-4'-methyldiphenylsulfide, benzylmethylketal, dimethylaminomethylbenzoate, 2-n-butoxyethyl-4-dimethylaminobenzoate, isoamyl p-dimethylaminobenzoate, 3,3'-dimethyl-4methoxybenzophenone, methyloxybenzoylformate, 2-methyl-1-(4-(methylthio)phenyl)-2morpholinopropane-1-one, 2-benzyl-2-dimethylamino-1-(4-morpholinophenyl)-butane-1-one, 1-(4-dodecylphenyl)-2-hydroxy-2-methylpropane-1-one, 1-hydroxycyclohexylphenylketone, 2-hydroxy-2-methyl-1-phenylpropane-1-one, 1-(4-isopropylphenyl)-2-hydroxy-2-methylpropane-1-one, 2-chlorothioxanthone, 2,4-diethylthioxanthone, 2,4-diisopropylthioxanthone, 2,4-dimethylthioxanthone, isopropylthioxanthone, 1-chloro-4-propoxythioxanthone, or mixtures thereof. The content of the photopolymerization initiator is preferably 0.5 to 30% by weight, more preferably 2 to 15% by weight of the double bond-containing photo-curing composition.

In combination with the photopolymerization initiator, a hexaarylbisimidazol compound or a hydrogen donor may be used. The hexaarylbisimidazol compound may be a compound as disclosed in U.S. Pat. No. 3,784,557 or EP-24629-A. Specific examples of the hexaarylbisimidazol compound may include 2,2'-bis(o-chlorophenyl)-4,4',5,5'-tetraphenylbisimidazolyl, or 2,2'-bis(o-chlorophenyl)-4,4',5,5'-tetra-(p-methoxyphenyl)bisimidazolyl, which are preferred due to their stability and sensitivity. The content of the hexaarylbisimidazol compound is preferably 0.5 to 30% by weight, more preferably 2 to 15% by weight of the double bond-containing photocuring compound.

The hydrogen donor may be an aromatic mercaptan compound or an aromatic amine compound. The aromatic mercaptan hydrogen donor may preferably be a compound having a benzene or a heterocyclic ring with one or two mercapto groups therein. When the compound has two substituted mercapto groups, either of the mercapto groups may be substituted by an alkyl group, an aralkyl group, or a phenyl group, or the compound may be a dimer in the form of disulfide. The aromatic mercaptan hydrogen donor may be 2-mercaptobenzothiazole, 2-mercaptobenzoxazol, or the like. The content of the aromatic mercaptan hydrogen donor is preferably 0.5 to 30% by weight, more preferably 2 to 15% by weight of the double bond-containing photocuring compound.

The aromatic amine hydrogen donor may preferably be a compound having a benzene or a heterocyclic ring with one or two amino groups therein. At least one hydrogen atom in the amino group may be substituted by an alkyl group or a substituted alkyl group. When the compound has two amino groups, either of the amino groups may be substituted by a carboxyl group, an alkoxycarbonyl group, a substituted alkoxycarbonyl group, a phenoxycarbonyl group, a substituted phenoxycarbonyl group, or a nitrile group. The content of the aromatic amine hydrogen donor is preferably 0.5 to 30% by weight, more preferably 2 to 15% by weight of the double bond-containing photocuring compound.

In preparing the photocuring black-hued coating material, a film forming polymer binder may optionally be added. Examples of the film forming polymer binder may include polymethacrylate or partially hydrolyzed compound thereof, polyvinyl acetate or hydrolyzed compound thereof, polystyrene, polyvinylbutyral, polychloroprene, polyvinylchloride, chlorinated polyethylene, chlorinated polypropylene, polyvinyl pyrrolidone, a copolymer of styrene and maleic anhydride or half ester thereof, or a copolymer of two or more kinds of copolymerizable monomers selected from (meth)acrylic acid, (meth)acrylate, acrylamide, or acrylonitrile, or mixtures thereof.

In preparing the photocuring black-hued coating material, other coloring agent may be added in addition to the black pigment A. Examples of the coloring agent may include, for example, dyes or pigments such as vanadium trioxide, manganese dioxide, molybdenum disulfide, triiron tetraoxide, Aniline Black, Sudan Black B, Acid Black 1 and 52, Fast Black K Salt, Nigrosin, or mixtures thereof. More specifically, the dyes and pigments shown in "COLOR INDEX", third edition, may be employed.

In preparing the photocuring black-hued coating material, various assistant agents such as a dispersion assistant agent for dyes and pigments, a leveling agent for improving the smoothness of the film, or a viscosity adjustment agent may be added.

The photocuring black-hued coating material may be prepared, specifically, by mixing the black pigment A optionally with the double bond-containing photocuring compound, the epoxy compound, the photopolymerization initiator, the film forming polymer binder, the other coloring agent, and/or the various kinds of assistant agents, depending on the need. The mixing may be carried out by an ordinary mixing device or a dispersing devise. The obtained photocuring black-hued coating material may be used after it is subjected to filtration for the purpose of removing the coarse particles or foreign substances in the system. The filtration may be carried out under pressure using a filter of membrane, surface, or depth type having the pore size of not more than 5 µm, preferably 0.1 to 3 µm.

The photocuring black-hued coating material may be diluted with an organic solvent before use in order to improve the readiness of coating on a substrate.

Examples of the organic solvent may include an alkyl cellosolve such as methyl cellosolve, ethyl cellosolve, propyl cellosolve, isopropyl cellosolve, or butyl cellosolve, or acetates of these alkyl cellosolves; an alkylene glycol such as ethylene glycol, diethylene glycol, or propylene glycol, or alkyl ethers or alkyl ether acetates of these alkylene glycols; cyclohexanone, diethylene glycol dimethyl ether, toluene, xylene, or mixtures thereof. The organic solvent may usually be added so that the solid content is 5 to 80% by weight.

The photocuring black-hued coating material may be used for producing a black matrix of a color filter. One example of procedure for producing a black matrix is described below. First, the photocuring black-hued coating material is coated on a support body such as a glass plate, a polycarbonate plate, a silicone wafer, paper, a plastic sheet, or a synthetic paper by a coating method using a bar coater, a spin coater, or a roll coater, or by such method as spray coating, dipping, gravure printing, or screen printing, and the solvent is dried to form a smooth film. For forming desired pixels on the film, ultraviolet rays are irradiated via a negative photomask usually at 20 to 500 mJ/cm2. In this step, it is preferred to use a mask aligner or the like device so that parallel rays are uniformly irradiated over the entire film. If necessary, the irradiated film may be heated for a short period of time to promote polymerization. Then the obtained product is immersed in a developing solution or exposed to a shower of a developing solution to dissolve the uncured portions of the film for development. The remaining portions of the film are cured completely by a high temperature post baking process to obtain the desired black matrix. The preferable film thickness of the black matrix is usually 0.2 to 5.0 μm.

The developing solution may preferably be an aqueous solution of inorganic alkali such as sodium hydroxide, potassium hydroxide, sodium carbonate, or sodium metasilicate; or organic amine such as tetramethylammoniumhydroxide.

A coating material containing the black pigment A and which is photocuring and can be electrodeposited (referred to as "photocuring black-hued electrodeposition coating material" hereinbelow) may be produced by mixing the black pigment A with the double bond-containing photocuring compound having at least one acid group, the photopolymerization initiator, or the like.

Examples of the double bond-containing photocuring compound having at least one acid group may include epoxy (meth)acrylate to which carboxylic acid is added obtained by reacting an acid anhydride with a hydroxyl group generated by reacting (meth)acrylic acid with an epoxy group contained in bisphenol A epoxy resin, bisphenol F epoxy resin, novolak epoxy resin, polycarboxylic acid polyglycidyl ester, polyolpolyglycidyl ether, aliphatic epoxy resin, alicyclic epoxy resin, amine epoxy resin, triphenolmethane epoxy resin, dihydroxybenzene epoxy resin, or the like; a half-esterified copolymer of maleic anhydride and ethylene, propylene, isobutylene, styrene, vinylphenol, acrylic acid, acrylic acid ester, acrylamide, or mixtures thereof, obtained by reacting the maleic anhydride portion the copolymer with an acrylate having an alcoholic hydroxyl group such as hydroxylethylacrylate, or an acrylate having an epoxy group such as glycidylmethacrylate; a copolymer of acrylic acid or an acrylic acid ester and an acrylate having an alcoholic hydroxyl group such as hydroxyethylacrylate, a hydroxyl group of which copolymer is reacted with acrylic acid; or mixtures thereof.

Examples of the photopolymerization initiator may include, for example, benzoin ether, benzoin isobutyl ether, benzoin isopropyl ether, benzophenone, benzoylbenzoic acid, methyl benzoylbenzoic acid, 4-benzoyl-4'-methyldiphenylsulfide, benzylmethylketal, dimethylaminomethylbenzoate, 2-n-butoxyethyl-4-dimethylaminobenzoate, isoamyl p-dimethylaminobenzoate, 3,3'-dimethyl-4-methoxybenzophenone, methyloxybenzoylformate, 2-methyl-1-(4-(methylthio)phenyl)-2-morpholinopropane-1-one, 2-benzyl-2-dimethylamino-1-(4-morpholinophenyl)-butane-1-one, 1-(4-dodecylphenyl)-2-hydroxy-2-methylpropane-1-one, 1-hydroxycyclohexylphenylketone, 2-hydroxy-2-methyl-1-phenylpropane-1-one, 1-(4-isopropylphenyl)-2-hydroxy-2-methylpropane-1-one, 2-chlorothioxanthone, 2,4-diethylthioxanthone, 2,4-diisopropylthioxanthone, 2,4-dimethylthioxanthone, isopropylthioxanthone, 1-chloro-4-propoxythioxanthone, and mixtures thereof. The content of the photopolymerization initiator is preferably 0.5 to 30% by weight, more preferably 2 to 15% by weight of the double bond-containing photocuring compound.

In combination with the photopolymerization initiator, a hexaarylbisimidazol compound or a hydrogen donor may be used. The hexaarylbisimidazol compound may be a compound as disclosed in U.S. Pat. No. 3,784,557 or EP-24629-A. Specific examples of the hexaarylbisimidazol compound may include 2,2'-bis(o-chlorophenyl)-4,4',5,5'-tetraphenylbisimidazolyl, or 2,2'-bis(o-chlorophenyl)-4,4',5,5'-tetra-(p-methoxyphenyl)bisimidazolyl, which are preferred due to their stability and sensitivity. The content of the hexaarylbisimidazol compound is preferably 0.5 to 30% by weight, more preferably 2 to 15% by weight of the double bond-containing photocuring compound.

The hydrogen donor may be an aromatic mercaptan compound or an aromatic amine compound. The aromatic mercaptan hydrogen donor may preferably be a compound having a benzene or a heterocyclic ring with one or two mercapto groups therein. When the compound has two substituted mercapto groups, either of the mercapto groups may be substituted by an alkyl group, an aralkyl group, or a phenyl group, or the compound may be a dimer in the form of disulfide. The aromatic mercaptan hydrogen donor may be 2-mercaptobenzothiazole, 2-mercaptobenzoxazol, or the like. The content of the aromatic mercaptan hydrogen donor is preferably 0.5 to 30% by weight, more preferably 2 to 15% by weight of the double bond-containing photocuring compound.

The aromatic amine hydrogen donor may preferably be a compound having a benzene or a heterocyclic ring with one or two amino groups therein. At least one hydrogen atom in the amino group may be substituted by an alkyl group or a substituted alkyl group. When the compound has two amino groups, either of the amino groups may be substituted by a carboxyl group, an alkoxycarbonyl group, a substituted alkoxycarbonyl group, a phenoxycarbonyl group, a substituted phenoxycarbonyl group, or a nitrile group. The content of the aromatic amine hydrogen donor is preferably 0.5 to 30% by weight, more preferably 2 to 15% by weight of the double bond-containing photocuring compound.

In preparing the photocuring black-hued electrodeposition coating material, a binder resin for electrodeposition may optionally be added. The binder resin for electrodeposition is preferably a resin having at least one cationic group or anionic group.

Specific examples of the resin having at least one cationic group may include resins which are obtained by introducing at least one amino group or onium group such as ammonium, sulfonium, or phosphonium into a resin such as acrylic resin, epoxy resin, urethane resin, polybutadiene resin, polyamide resin. It is preferred to use these resins after they are neutralized with acid such as formic acid, acetic acid, propionic acid, or lactic acid or an acid substance to make the resin soluble or dispersible in water.

Examples of the resin having at least one anionic group may include acrylic resin, polyester resin, unsaturated fatty oil resin, polybutadiene resin, or epoxy resin, all having at least one carboxyl group or the like. It is preferred to use these resins after they are neutralized with a basic substance such as triethylamine, diethylamine, dimethylethanolamine, ammonia, or the like to make the resins soluble or dispersible in water.

The content of the binder resin for electrodeposition is preferably not more than 90% by weight, more preferably not more than 70% by weight of the total weight of the binder resin and the double bond-containing photocuring compound having at least one acid group.

In preparing the photocuring black-hued electrodeposition coating material, other coloring agent than the black pigment A may be added. Examples of the other coloring agent may include, for example, a dye or a pigment such as vanadium trioxide, manganese dioxide, molybdenum disulfide, triiron tetraoxide, Aniline Black, Sudan Black B, Acid Black 1 and 52, Fast Black K Salt, Nigrosin, or mixtures thereof. More specifically, the dyes and pigments shown in "COLOR INDEX", third edition, may be employed.

In preparing the photocuring black-hued electrodeposition coating material, various assistant agents such as a dispersion assistant agent for the above-mentioned other coloring agent, a leveling agent for improving the smoothness of the coating film, a viscosity adjustment agent, or an anti-foaming agent may be added.

Specific method for preparing the photocuring black-hued electrodeposition coating material may include mixing the black pigment A optionally with the double bond-containing photocuring compound having at least one acid group, the photopolymerization initiator, the binder resin for electrodeposition, other coloring agent as mentioned above, the various kinds of assistant agents, an organic solvent, water, acidic substance, basic substance, or the like; dispersing the components thoroughly using a conventionally used dispersing apparatus such as a sand mill, a roll mill, an attriter, a ball mill, a homogenizer, or the like; and diluting the resulting dispersion with water to have the solid content of usually 4 to 25% by weight, preferably 7 to 20% by weight.

In preparing the photocuring black-hued electrodeposition coating material, when the black pigment A is used after the carboxyl groups therein are neutralized with a basic substance such as ammonia, trimethylamine, triethylamine, sodium hydroxide, or potassium hydroxide, solubility of the black pigment A in an organic solvent or water is improved, and thus the photocuring black-hued electrodeposition coating material may be prepared by dispersing the black pigment A using an ordinary stirring apparatus without the dispersing operation using the dispersion apparatus as mentioned above.

The various kinds of black-hued coating material as mentioned above may be used as a starting material for a black matrix to produce a color filter. The color filter may be produced, for example, by (i) a method of forming a black matrix on a plate such as a glass plate with the various kinds of black-hued coating materials, and then forming colored layers of red, green, and blue thereon; (ii) a method of forming colored layers of red, green and blue on a glass plate and the like, and then forming a black matrix thereon with the various kinds of black-hued coating materials; or (iii) a method of previously forming a black matrix and each colored layer on a separate plate respectively or in combination, and then transferring the previously formed black matrix and the colored layers onto the plate for a color filter.

The volume resistivity of the black matrix produced with the various kinds of black-hued coating material mentioned above may be controlled within the range of from $1 \times 10^2$ to $1 \times 10^{15}$ $\Omega$.cm by selecting the conditions for producing the black pigment A. For example, the volume resistivity of the black matrix can be increased to a level as high as $10^8$ to $10^{15}$ $\Omega$.cm by using the polymer (1) having high molecular weight of about 2000 to 50000 in number average molecular weight, or by increasing the amount of the polymer (1) used in contacting so that the weight ratio of the polymer (1) to the carbon material is about 1:1 to 5:1. On the other hand, the volume resistivity of the black matrix can be decreased to a level as low as $10^2$ to $10^7$ $\Omega$.cm by using the polymer (1) having low molecular weight of about 300 to 2000 in number average molecular weight, or by decreasing the amount of the polymer (1) used in contacting so that the weight ratio of the polymer (1) to the carbon material is about 0.5:1 to 0.9:1.

The desired volume resistivity of a black matrix for a color filter may vary depending on its structure and object of use, but in general, higher resistivity is preferred. In particular, in producing a color filter having red, green, and blue pixels by electrodeposition, low volume resistivity of the black matrix may cause over-coating of the colored electrodeposition coating materials on the black matrix. In order to avoid this, the volume resistivity of the black matrix is preferably $1 \times 10^5$ $\Omega$.cm to $1 \times 10^{15}$ $\Omega$.cm. The black matrix having high volume resistivity is hardly formed with the coating material containing the black pigment prepared by contacting the polymer having the conventional reactive groups but not having a hydroxyl group with the carbon material, or containing the black pigment prepared under the contacting conditions other than those defined in the present invention.

The various kinds of black-hued coating materials prepared with the black pigment A may be used for producing a black matrix of a counterelectrode substrate for a black and white display TFT array substrate besides the black matrix of a color filter. Further, the black-hued coating materials may preferably be used for giving light-shielding properties to a liquid crystal sealing agent or spacers for a liquid crystal display. For these particular purposes, it is preferred to use the black pigment A having high volume resistivity.

According to the method of the present invention, a black pigment can easily be produced which can be dispersed in a carrier fluid a thigh density. The black pigment may be used as a coloring agent for resins, a filler, a black-hued printing ink, or a coating material for forming a light-shielding layer such as a black-hued electrodeposition coating material, a thermosetting black-hued coating material, a photocuring black-hued coating material, or a photocuring black-hued electrodeposition coating material. These coating materials are superior in long-term stability with minimum change in the electrodeposition properties with the lapse of time. Further, the coating films formed with these coating materials exhibit excellent light-shielding properties and planarity even in the form of a thin film. The electrical conductivity of these films can be controlled as desired, and can be lowered as compared to that of the light-shielding layer produced with the conventional carbon material.

EXAMPLES

The present invention is now explained in more detail with reference to Examples and Comparative Examples, but the present invention is not limited thereto.

Example 1

1500 g of butyl cellosolve was charged into a reactor of 5 liter capacity fitted with a stirrer, a condenser, and a thermometer, heated to 80° C., and stirred. Subsequently, a mixture consisting of 630 g of isobutyl acrylate, 215 g of butyl acrylate, 360 g of methyl methacrylate, 210 g of hydroxyethyl acrylate, 85 g of acrylic acid, and 15 g of azoisobutyronitrile as a polymerization initiator was continuously added dropwise into the reactor over 4 hours, and then the reaction was continued for 2 hours, thereby obtaining a varnish (B) containing a polymer having the number average molecular weight of 16000. The solid content of the polymer was 50% by weight, the content of carboxyl groups therein was 80.9 mmol per 100 g of the polymer, and the content of hydroxyl groups therein was 120 mmol per 100 g of the polymer.

400 parts by weight of the varnish (B) (the solid content of 200 parts by weight) and 200 parts by weight of carbon black manufactured by DEGUSSA AG under the trade name of "Special Black 4" (channel black, average particle size: 0.025 μm, pH 3) (referred to as "Special Black 4" hereinbelow) were charged in a stainless steel beaker, and butyl cellosolve was added to the mass to adjust the solid content to be 35% by weight. The resulting mixture was kneaded for 30 minutes. Then glass beads were added to the mixture and the mixture was stirred at 3000 rpm for 2 hours. Excess solvent was evaporated under reduced pressure, and the obtained paste was kneaded by a kneader having two rolls at 60 rpm at 150° C. for 20 minutes. The kneaded material obtained was completely dispersed in diethylene glycol dimethyl ether at the concentration of 10% by weight, and subsequently concentrated under reduced pressure to the concentration of 70% by weight. 100 parts by weight of the obtained concentrate (the solid content of 70 parts by weight) was mixed with 50 parts by weight of the varnish (B) concentrated to the solid content of 80% (the solid content of 40 parts by weight), 25 parts by weight of SUMIMAL M-66B (trade name, manufactured by SUMITOMO CHEMICAL CO., LTD., a curing agent, mixed etherified melamine resin) (referred to as "SUMIMAL M-66B" hereinbelow), and 8 parts by weight of triethylamine, dispersed thoroughly using a ball mill, and the obtained dispersion was diluted with water to the concentration of 20%, thereby obtaining a black-hued electrodeposition coating material CBT-1.

Next, CBT-1, which has anionic electrodeposition property, was charged into a stainless steel beaker, and CORNING 7059 GLASS (trade name) of 1.1 mm thick having ITO (indium-tin oxide) film of 100 nm thick on the surface thereof (referred to as "glass substrate" hereinbelow) was inserted into the beaker to perform electrodeposition under each of the conditions to be mentioned below, using the beaker as a cathode and the glass substrate as an anode. After the electrodeposition, the glass substrate was hoisted from the beaker, washed with ion-exchanged water, dried, and heated at 220° C. for 1 hour. The film thickness after the heating was measured, and the electrodeposition properties of CBT-1 was determined. The results are shown in FIG. 1.

Condition 1: The electrodeposition was carried out by linearly raising the electrical voltage to 30 V in the first 5 seconds, and keeping the electrical voltage at 30 V for the predetermined period of time.

Condition 2: The electrodeposition was carried out by linearly raising the electrical voltage to 40 V in the first 5 seconds, and keeping the electrical voltage at 40 V for the predetermined period of time.

Condition 3: The black-hued electrodeposition coating material was left in an oven at 40° C. for 2 weeks after preparation, and then the electrodeposition was carried out in the same way as in Condition 1.

Condition 4: The black-hued electrodeposition coating material was left in an oven at 40° C. for 2 weeks after preparation, and then the electrodeposition was carried out in the same way as in Condition 2.

It was confirmed from FIG. 1 that the electrodeposition rate per unit period of time of CBT-1 was small, and change in electrodeposition properties was small even after CBT-1 was heated at 40° C. for 2 weeks. The smoothness of the coating surface of the obtained coating film was good, and no change in appearance of the coating surface by heating CBT-1 at 40° C. for 2 weeks before electrodeposition was observed.

Example 2

Figure 2:
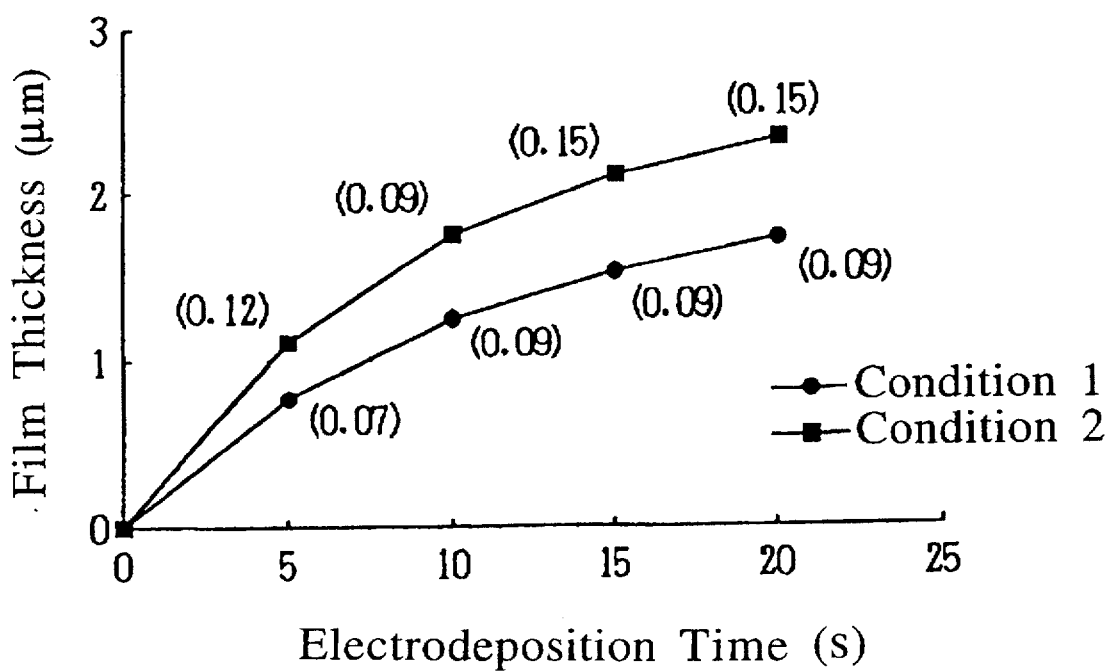
FIG. 2 is a graph showing the results of measurements of the electrodeposition properties of the black-hued electrodeposition coating materials prepared in Example 2.

143 parts by weight of the concentrate obtained in Example 1 (the solid content of 100 parts by weight) was mixed with 31 parts by weight of the varnish (B) concentrated to the solid content of 80% (the solid content of 25 parts by weight), 25 parts by weight of SUMIMAL M-66B, 15 parts by weight of phenylpropylene glycol manufactured by NIPPON NYUKAZAI KK, and 4 parts by weight of triethylamine, dispersed thoroughly using a homogenizer, and the resulting dispersion was diluted with water to 20%, thereby obtaining a black-hued electrodeposition coating material CBT-2. Next, CBT-2, which has anionic electrodeposition property, was charged into a stainless steel beaker, and a glass substrate was inserted into the beaker to perform electrodeposition according to Conditions 1 and 2 in Example 1, using the beaker as a cathode and the glass substrate as an anode. After the electrodeposition, the glass substrate was hoisted from the beaker, washed with ion-exchanged water, dried, and heated at 220° C. for 1 hour. The film thickness after the heating was measured, and the electrodeposition properties of CBT-2 was determined. The results are shown in FIG. 2. Incidentally, in FIG. 2 as well as in FIGS. 3 to 5 to be discussed later, the number in the parentheses shows the vertical distance (μm) between the highest point and the lowest point in the profile of the portion of the film at which the film thickness was measured. It was confirmed from FIG. 2 that the electrodeposition rate per unit period of time of CBT-2 was small. The smoothness of the coating surface of the obtained coating film was good.

Electrodeposition properties were measured of CBT-2 after it was left in an oven at 40° C. for 2 weeks in the same way as above, and the deterioration promoting test of the coating material was carried out. It was found that the change in the electrodeposition properties was small, and no change in appearance of the coating film was observed.

Comparative Example 1

30 parts by weight of carbon black MA100R (trade name, furnace black manufactured by MITSUBISHI KASEI CORPORATION; average particle size: 0.022 μm; pH 3.5) (referred to as "MA100R" hereinbelow) was mixed with 94 parts by weight of the varnish (B) concentrated to the solid content of 80% (the solid content of 75 parts by weight), 25 parts by weight of SUMIMAL M-66B, and 15 parts by weight of phenylpropylene glycol, and further admixed with triethylamine to neutralize the mixture to the neutralization degree of 0.75, dispersed thoroughly using a pearl mill, and the obtained dispersion was diluted with water to 20%, thereby obtaining a black-hued electrodeposition coating material CBT-3. Next, CBT-3, which has anionic electrodeposition property, was charged in a stainless steel beaker, and a glass substrate was inserted into the beaker to perform electrodeposition under each of the conditions to be mentioned below, using the beaker as a cathode and the glass substrate as an anode. After the electrodeposition, the glass substrate was hoisted from the beaker, washed with ion-exchanged water, dried, and heated at 220° C. for 1 hour. The film thickness after the heating was measured, and the electrodeposition properties of CBT-3 was determined. The results are shown in FIG. 3.

Condition 1: The electrodeposition was carried out by linearly raising the electrical voltage to 30 V in the first 5 seconds, and keeping the electrical voltage at 30 V for the predetermined period of time.

Condition 5: The black-hued electrodeposition coating material was left in an oven at 40° C. for 13 days after preparation, and then the electrodeposition was carried out in the same way as in Condition 1.

Figure 3:
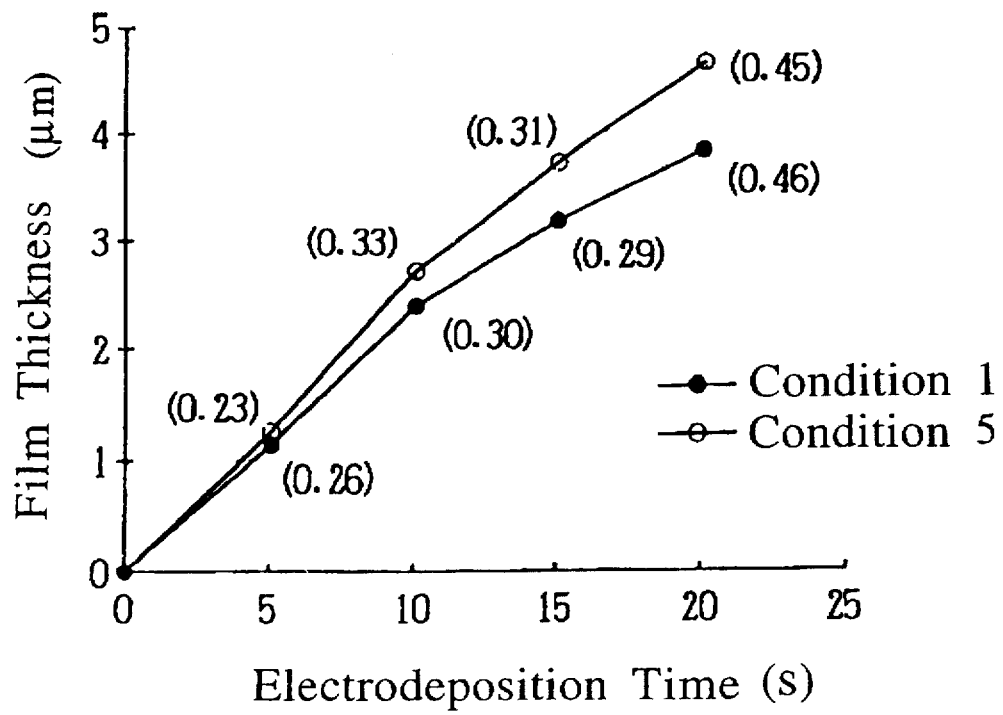
FIG. 3 is a graph showing the results of measurements of the electrodeposition properties of the black-hued electrodeposition coating material prepared in Comparative Example 1.

It was confirmed from FIG. 3 that the electrodeposition rate per unit period of time of CBT-3 was larger than that of CBT-1 and CBT-2, and the change in the electrodeposition properties after CBT-3 was heated at 40° C. for 2 weeks was larger than that in Example 1. The smoothness of the coating surface of the obtained coating film was inferior to those in Examples 1 and 2.

Comparative Example 2

Figure 4:
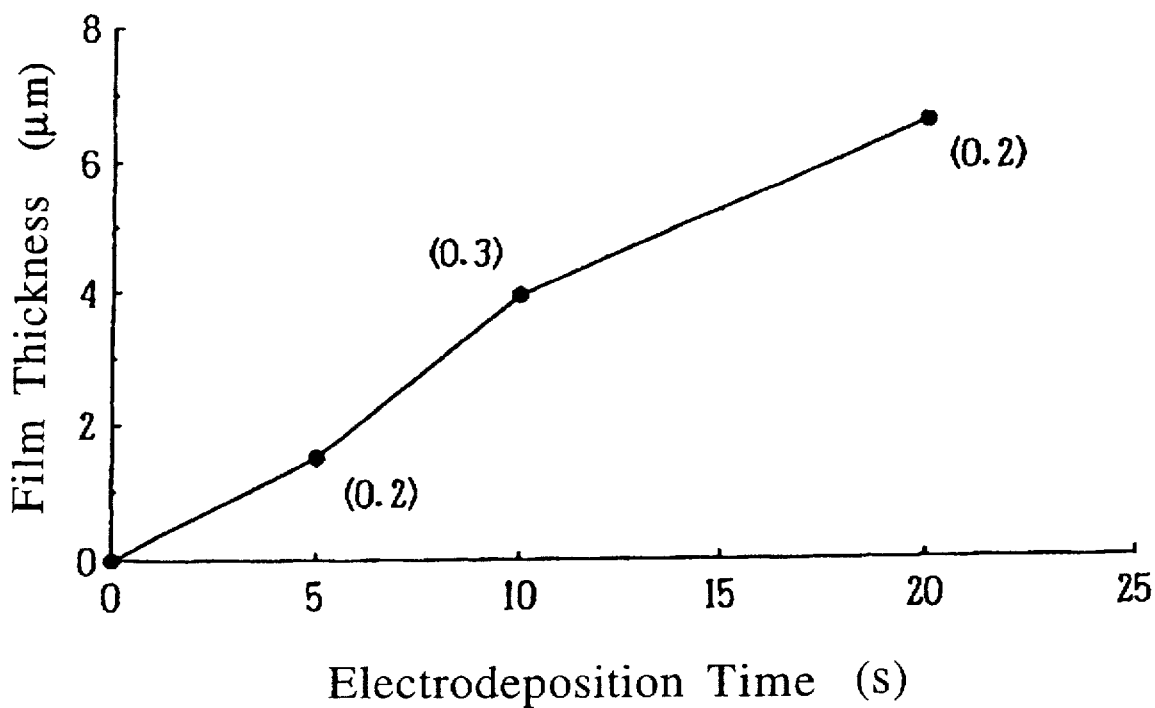
FIG. 4 is a graph showing the results of measurements of the electrodeposition properties of the black-hued electrodeposition coating materials prepared in Comparative Example 2.

45 parts by weight of MA100R was mixed with 88 parts by weight of the varnish (B) concentrated to the solid content of 80% (the solid content of 70 parts by weight), 30 parts by weight of SUMIMAL M-66B, and 15 parts by weight of phenylpropylene glycol, and further admixed with triethyamine to neutralize the mixture to the neutralization degree of 0.75, dispersed thoroughly using a pearl mill, and the obtained dispersion was diluted with water to 20%. The diluted dispersion was then processed by a nanomizer, thereby obtaining a black-hued electrodeposition coating material CBT-4. Next, CBT-4, which has anionic electrodeposition property, was charged in a stainless steel beaker, and a glass substrate was inserted into the beaker to perform electrodeposition according to Condition 1 in Example 1, using the beaker as a cathode and the glass substrate as an anode. After the electrodeposition, the glass substrate was hoisted from the beaker, washed with ion-exchanged water, dried, and heated at 220° C. for 1 hour. The film thickness after the heating was measured, and the electrodeposition properties of CBT-4 was determined. The results are shown in FIG. 4. It was confirmed from FIG. 4 that the electrodeposition rate per unit period of time of CBT-4 was larger than that of CBT-1 and CBT-2. The smoothness of the coating surface of the obtained coating film was inferior to those of Examples 1 and 2.

Comparative Example 3

Figure 5:
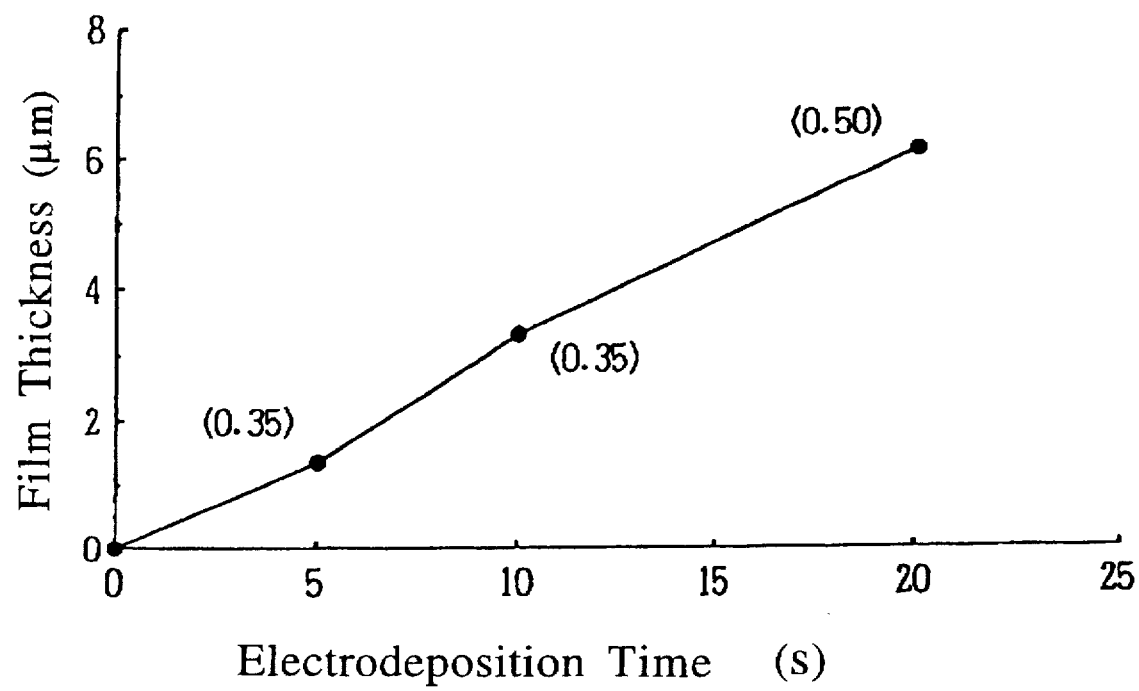
FIG. 5 is a graph showing the results of measurements of the electrodeposition properties of the black-hued electrodeposition materials prepared in Comparative Example 3.

50 parts by weight of MA100R was mixed with 88 parts by weight of the varnish (B) concentrated to the solid content of 80% (the solid content of 70 parts by weight), 30 parts by weight of SUMIMAL M-66B, and 15 parts by weight of phenylpropylene glycol, and further admixed with triethylamine to neutralize the mixture to the neutralization degree of 0.75, dispersed thoroughly using a pearl mill, and the obtained dispersion was diluted with water to 20%. The diluted dispersion was then processed by a nanomizer, thereby obtaining a black-hued electrodeposition coating material CBT-5. Next, CBT-5, which has anionic electrodeposition property, was charged in a stainless steel beaker, and a glass substrate was inserted into the beaker to perform electrodeposition according to Condition 1 in Example 1, using the beaker as a cathode and the glass substrate as an anode. After the electrodeposition, the glass substrate was hoisted from the beaker, washed with ion-exchanged water, dried, and heated at 220° C. for 1 hour. The film thickness after the heating was measured, and the electrodeposition properties of CBT-5 was determined. The results are shown in FIG. 5. It was confirmed from FIG. 5 that the electrodeposition rate per unit period of time of CBT-5 was larger than that of CBT-1 and CBT-2. The smoothness of the coating surface of the obtained coating film was inferior to those of Examples 1 and 2.

Comparative Example 4

400 parts by weight of the varnish (B) (the solid content of 200 parts by weight) and 200 parts by weight of Special Black 4 was charged in a stainless steel beaker, and acetone was added to the mass to adjust the solid content to be 35% by weight. The resulting mixture was kneaded for 30 minutes. Then glass beads were added to the mixture and the mixture was stirred at 3000 rpm for 2 hours. Excess solvent was evaporated under reduced pressure, and the obtained paste was kneaded by a kneader having two rolls at 60 rpm at 40° C. for 5 hours. The kneaded material was tried to be dispersed in diethylene glycol dimethyl ether, but it had extremely poor dispersibility. The kneaded material was further tried to be dispersed in solvents such as methyl ethyl ketone, methyl isobutyl ketone, acetone, 1-methyl-2-metoxyethanol, and isopropyl alcohol, but it had extremely poor dispersibility in any of these solvents.

Comparative Example 5

400 parts by weight of the varnish (B) (the solid content of 200 parts by weight) and 200 parts by weight of Special Black 4 were charged in a stainless steel beaker, and acetone was added to the mass to adjust the solid content to be 35% by weight. The resulting mixture was kneaded for 30 minutes. Then glass beads were added to the mixture and the mixture was stirred at 3000 rpm for 2 hours. Excess solvent was evaporated under reduced pressure, and the obtained paste was kneaded by a kneader having two rolls at 60 rpm at 260° C. for 20 minutes. The kneaded material obtained was tried to be dispersed in diethylene glycol dimethyl ether, but it had extremely poor dispersibility. The kneaded material was further tried to be dispersed in the solvents as in Comparative Example 4, but it had extremely poor dispersibility in any of these solvents.

Comparative Example 6

1500 g of isopropyl alcohol was charged into a reactor of 5 liter capacity fitted with a stirrer, a condenser, and a thermometer, heated to 65° C., and stirred. Subsequently, a mixture consisting of 840 g of isobutyl acrylate, 215 g of butyl acrylate, 360 g of methyl methacrylate, 85 g of acrylic acid, and 15 g of azoisobutyronitrile as a polymerization initiator was continuously added dropwise into the reactor over 4 hours, and then the reaction was continued for 2 hours, and further for 1 hour at an elevated temperature of 80° C., thereby obtaining a varnish (C) containing a polymer having the number average molecular weight of 16000. It was confirmed by potentiometric titration that the solid content of the polymer was 50% by weight, the content of carboxyl groups therein was 80.9 mmol per 100 g of the polymer, and that the polymer had no hydroxyl group.

400 parts by weight of the obtained varnish (C) (the solid content of 200 parts by weight) and 200 parts by weight of Special Black 4 were charged into a stainless steel beaker, and butyl cellosolve was added to the mass to adjust the solid content to be 35% by weight. The resulting mixture was kneaded for 30 minutes. Then glass beads were added to the mixture and the mixture was stirred at 3000 rpm for 2 hours. Excess solvent was evaporated under reduced pressure, and the obtained paste was kneaded by a kneader having two rolls at 60 rpm at 170° C. for 30 minutes. The kneaded material obtained was completely dispersed in diethylene glycol dimethyl ether at the concentration of 10% by weight, and subsequently concentrated under reduced pressure to the concentration of 70% by weight. 100 parts by weight of the obtained concentrate (the solid content of 70 parts by weight) was mixed with 50 parts by weight of the varnish (C) concentrated to the solid content of 80% (the solid content of 40 parts by weight), 25 parts by weight of SUMIMAL M-66B, and 8 parts by weight of triethylamine, dispersed thoroughly using a ball mill, and the obtained dispersion was diluted with water to 20%, thereby obtaining a black-hued electrodeposition coating material CBT-6.

Next, CBT-6 was tried to be determined as to its electrodeposition properties under the conditions as in Example 1, but the curing reaction of the coating film could not be effected sufficiently, and the surface of the coating film became rough during baking.

Comparative Example 7

1500 g of isopropyl alcohol was charged into a reactor of 5 liter capacity fitted with a stirrer, a condenser, and a thermometer, heated to 65° C., and stirred. Subsequently, a mixture consisting of 100 g of isobutyl acrylate, 315 g of methylmethacrylate, 1000 g of hydroxyethylacrylate, 85 g of acrylic acid, and 15 g of azoisobutyronitrile as a polymerization initiator was continuously added dropwise into the reactor over 4 hours, and then the reaction was continued for 2 hours, and further for 1 hour at an elevated temperature of 80° C., thereby obtaining a varnish (D) containing a polymer having the number average molecular weight of 15000. The solid content of the polymer was 50% by weight, the content of carboxyl groups therein was 78 mmol per 100 g of the polymer, and the content of hydroxyl groups therein was 575 mmol per 100 g of the polymer.

400 parts by weight of the obtained varnish (D) (the solid content of 200 parts by weight) and 200 parts by weight of Special Black 4 were charged into a stainless steel beaker, and butyl cellosolve was added to the mass to adjust the solid content to be 35% by weight. The resulting mixture was kneaded for 30 minutes. Then glass beads were added to the mixture and the mixture was stirred at 3000 rpm for 2 hours. Excess solvent was evaporated under reduced pressure, and the obtained paste was kneaded by a kneader having two rolls at 60 rpm at 150° C. for 20 minutes. The kneaded material obtained was tried to be dispersed in diethylene glycol dimethyl ether, but it had extremely poor dispersibility. The kneaded material was further tried to be dispersed in the solvents as in Comparative Example 4, but it had extremely poor dispersibility in any of these solvents.

What is claimed is:

1. A method for producing a black pigment comprising the step of contacting a polymer (1) containing 5 to 500 mmol of hydroxyl groups per 100 g of the polymer with a carbon material (2) at a temperature of 50° to 250° C., wherein said polymer does not contain an epoxy group, a thioepoxy group, an aziridine group, an oxazoline group, or an N-hydroxyalkylamido group.

2. The method as claimed in claim 1 wherein a content of said hydroxyl groups in said polymer (1) is 20 to 300 mmol per 100 g of the polymer (1).

3. The method as claimed in claim 1 wherein said polymer (1) further contains 30 to 300 mmol of carboxyl groups per 100 g of the polymer (1).

4. The method as claimed in claim 1 wherein said polymer (1) is selected from the group consisting of acrylic resin, epoxy resin, polyester resin, polyamide resin, polyimide resin, polycarbonate resin, polyurethane resin, polybutadiene resin, a copolymer of maleic anhydride, and derivatives of these resins, all of which contain 5 to 500 mmol of hydroxyl groups in a molecule thereof per 100 g of the resin.

5. The method as claimed in claim 1 wherein a number average molecular weight of the polymer (1) is 1000 to 100000.

6. The method as claimed in claim 1 wherein said carbon material (2) is selected from the group consisting of carbon black, aniline black, phenylene black, titan black, graphite, carbon fiber, carbon whisker, and mixtures thereof.

7. The method as claimed in claim 1 wherein said carbon material (2) is carbon black having an average particle size of not more than 1 μm, pH value of said carbon black being not more than 7 as measured in a form of an aqueous solution by a method according to ISO-787-9.

8. The method as claimed in claim 1 wherein said contacting step is carried out at a temperature of 100° to 200° C.

9. The method as claimed in claim 1 wherein a mixing ratio of said polymer (1) to said carbon material (2) in said contacting step is 0.5:1 to 5:1 by weight ratio.

10. The method as claimed in claim 1 wherein said contacting step is carried out by stirring and mixing for 1 minute to 24 hours using a pulverizer.

11. The method as claimed in claim 1 wherein said contacting step is carried out in the presence of a solvent selected from the group consisting of isopropyl alcohol, methyl ethyl ketone, hexane, diethylene glycol dimethyl ether, and mixtures thereof.

* * * * *